July 24, 1962 J. K. BRUCE 3,045,803
APPARATUS FOR SHORT TERM ACCUMULATION OF CONVEYED ARTICLES
Filed Oct. 20, 1958 9 Sheets-Sheet 1

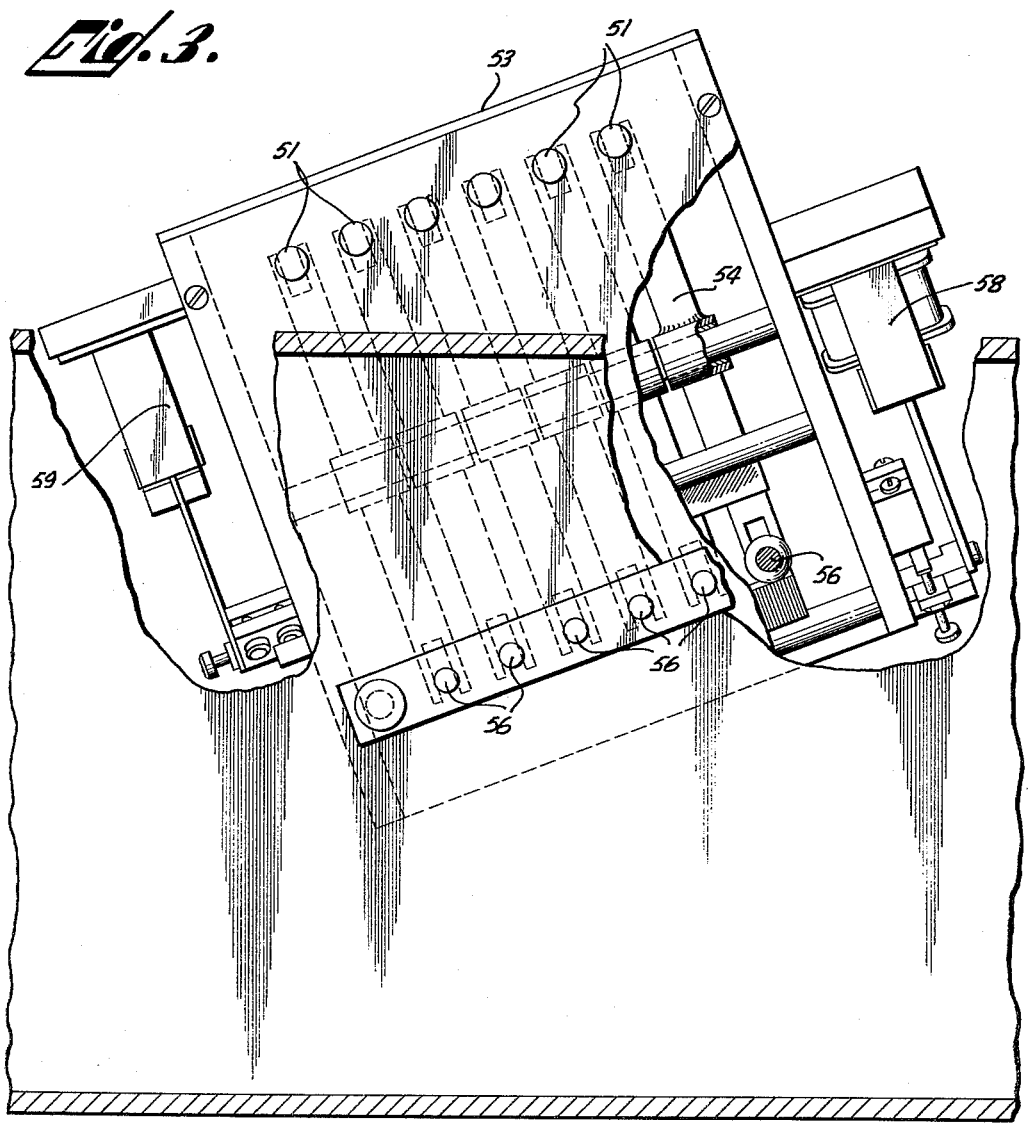

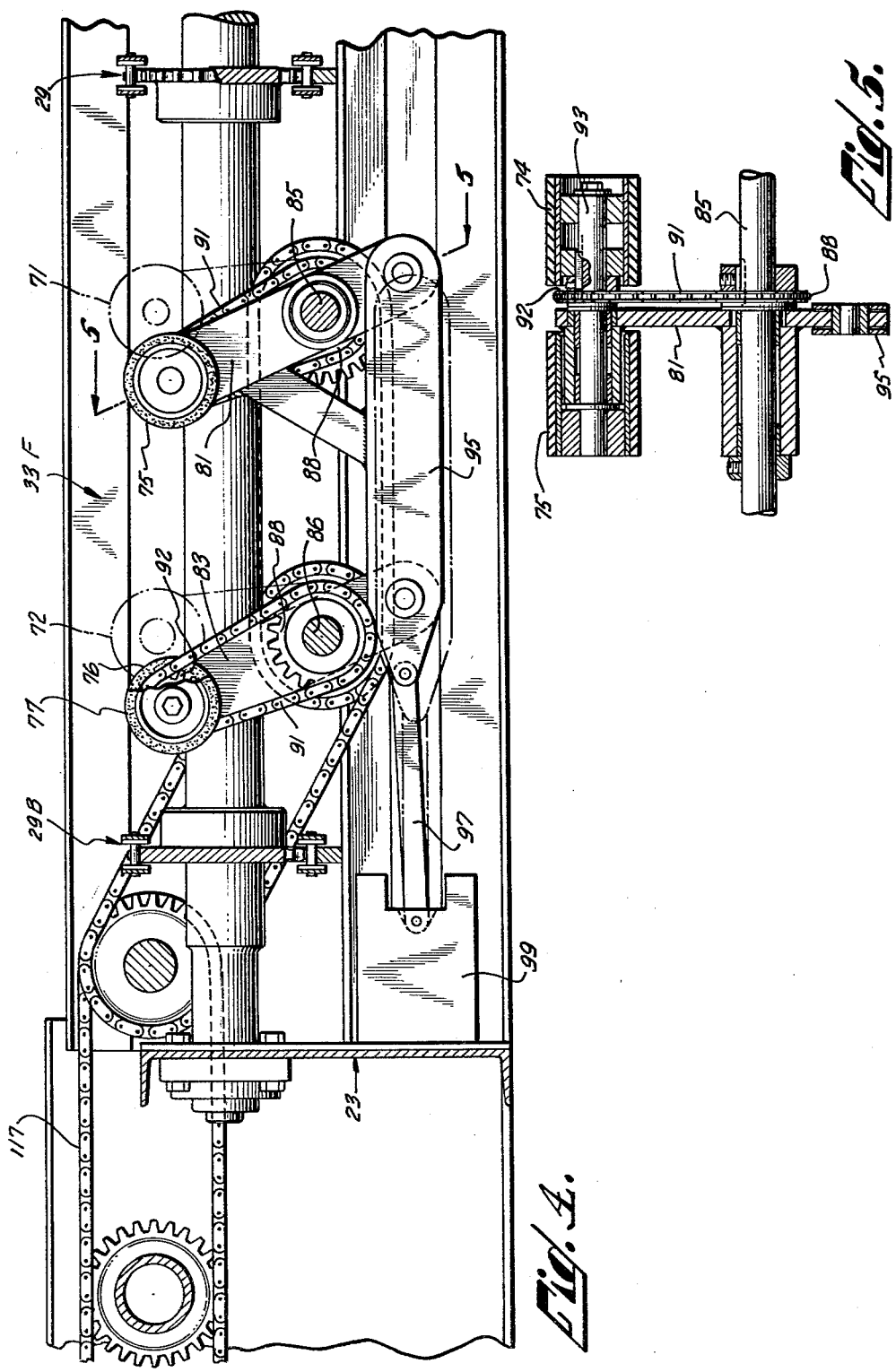

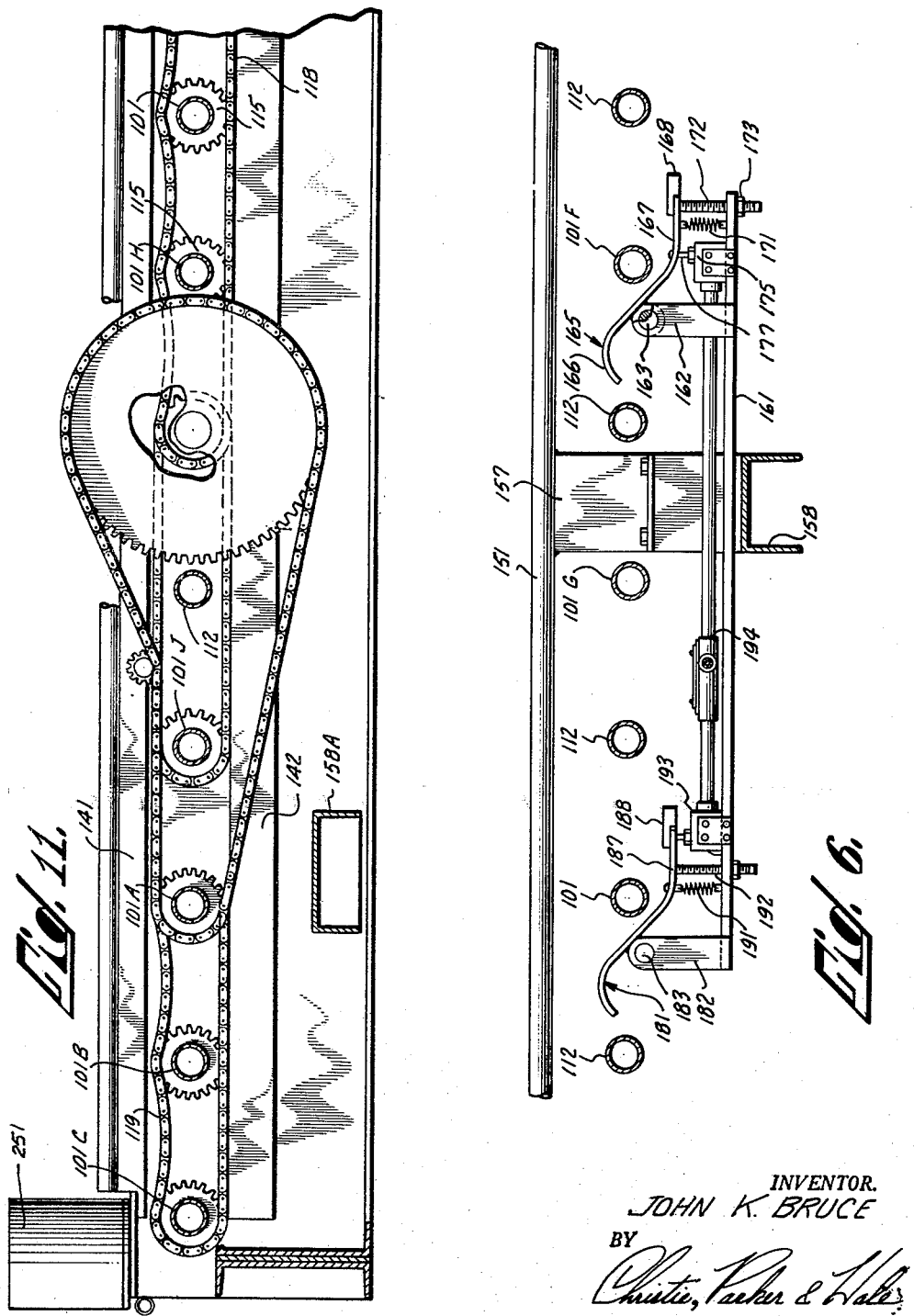

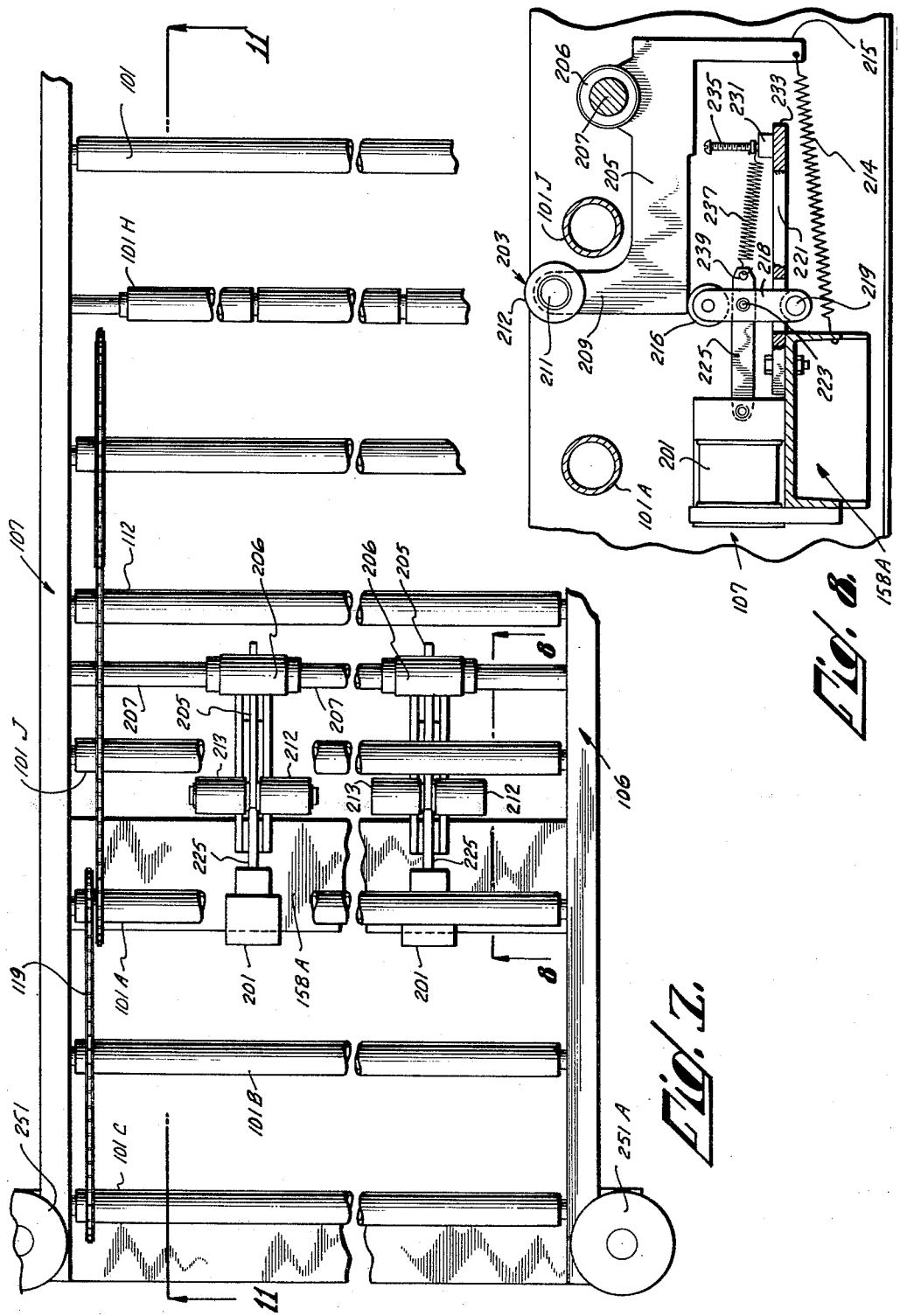

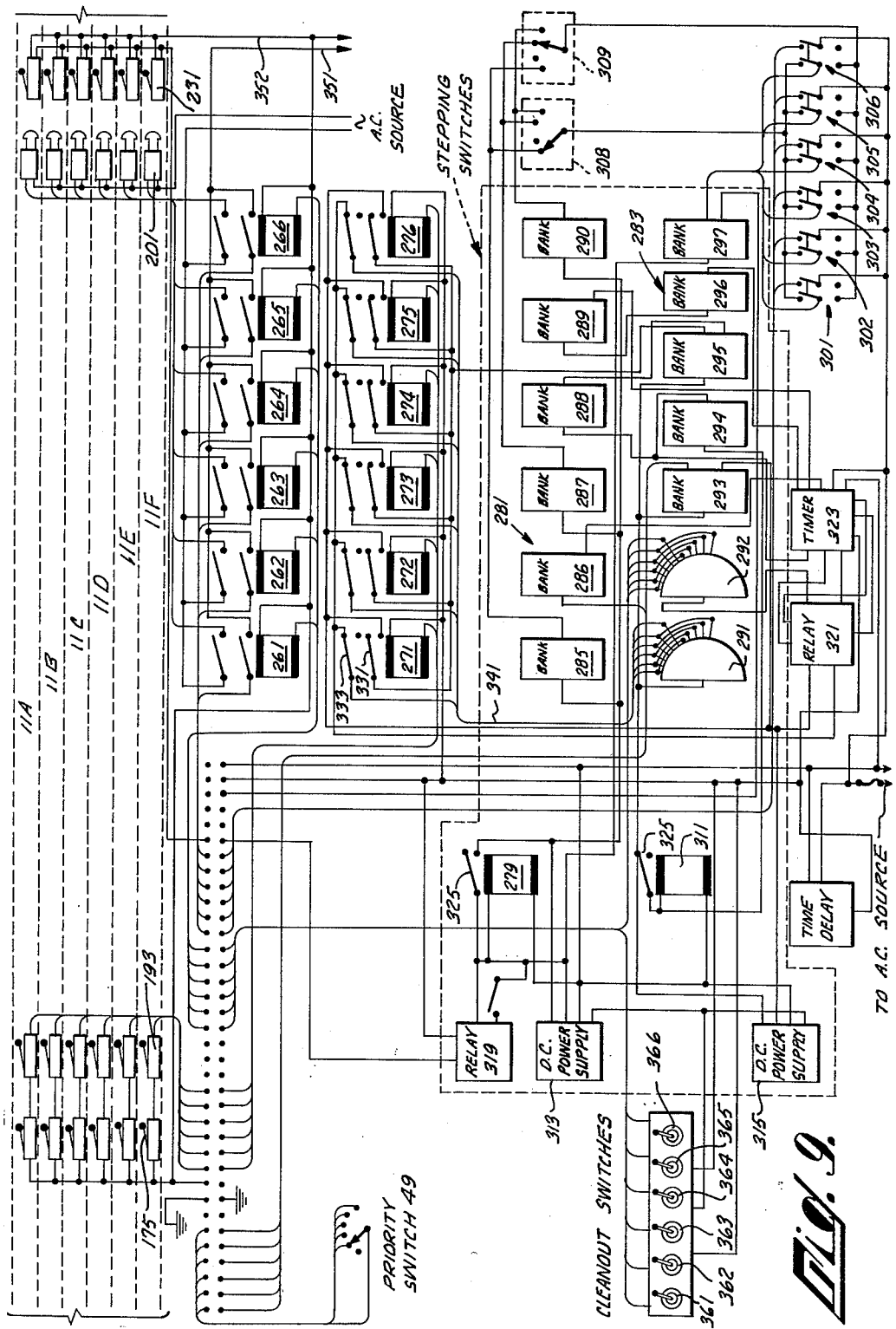

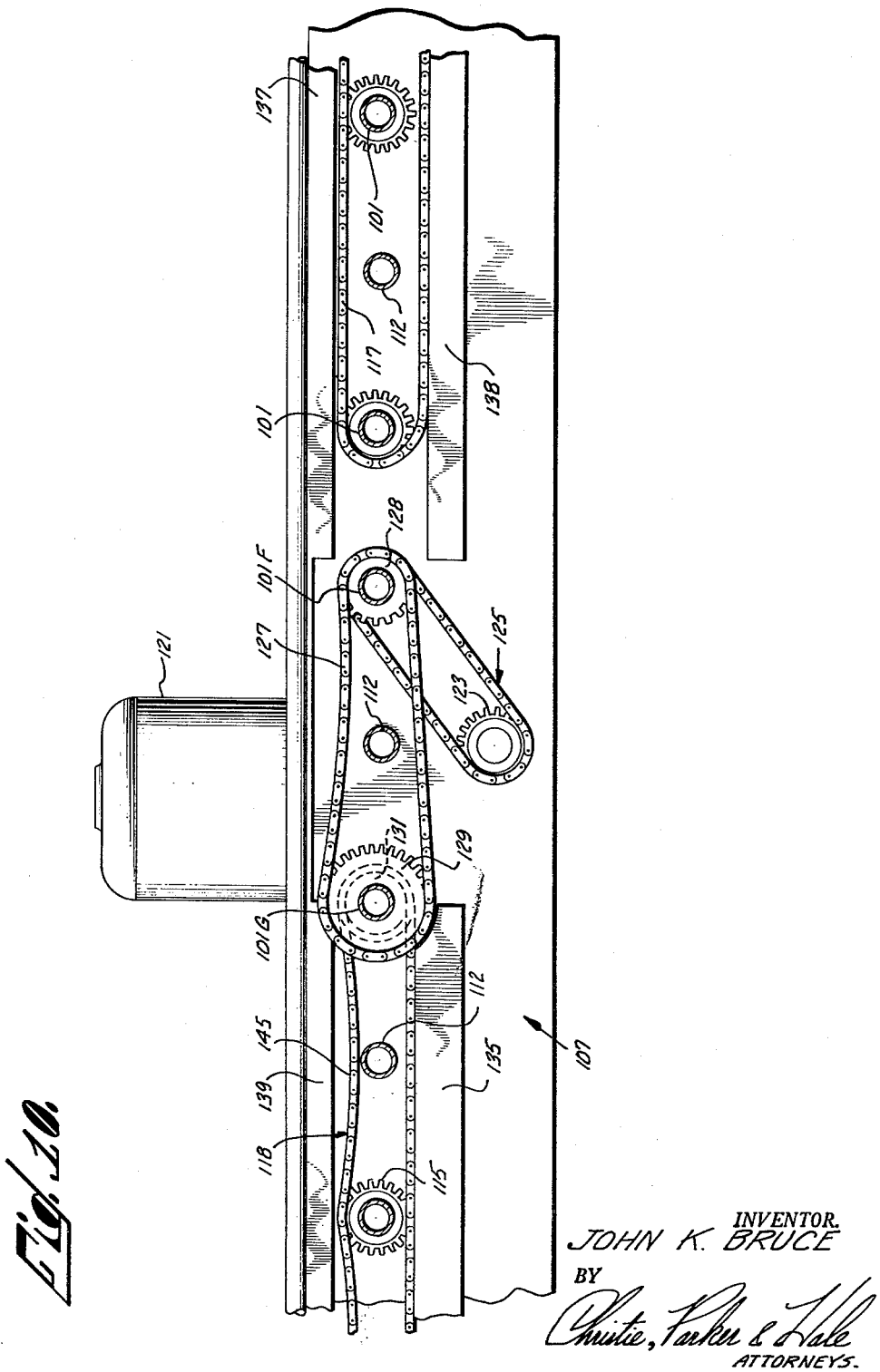

July 24, 1962 J. K. BRUCE 3,045,803
APPARATUS FOR SHORT TERM ACCUMULATION OF CONVEYED ARTICLES
Filed Oct. 20, 1958 9 Sheets-Sheet 9

3,045,803
APPARATUS FOR SHORT TERM ACCUMULATION OF CONVEYED ARTICLES
John K. Bruce, La Verne, Calif.
(966 S. Fair Oaks, Pasadena, Calif.)
Filed Oct. 20, 1958, Ser. No. 768,171
9 Claims. (Cl. 198—40)

The invention relates to apparatus for detaining or storing conveyed articles for short periods of time during the progression of the articles in a conveying system and for discharging and counting the articles upon cessation of detention thereof.

In conveyor systems which transport articles between various processing stations there is often a need to accumulate a group or batch of similar articles so that the entire group so accumulated can be processed at once. For instance, in the fruit processing and packaging industry, fruit is inititally boxed after washing in accordance with ripeness. After the washing and boxing stage, the fruit is stored until it reaches a desired sugar content. The period of storage varies with the degree of ripeness at the time the fruit was picked. The fruit is conveyed from the boxing stations to the storage facility on a single conveyor, and the boxes of fruit are not put on the conveyor in any particular sorted order.

Prior to storage the fruit is stacked. The conventional stacking apparatus handles a certain number of boxes at one time. It builds a stack which the conventional box handling apparatus such as a fork-lift truck can convey from place to place. It is desirable that each of the stacks contain fruit of the same degree of ripeness so that they may be stored for the same period and at the same temperature. Therefore, this is one particular instance in which a series of unlike articles on an input conveyor are preferably dispatched from the input conveyor into a short term storage area which accommodates or holds the articles until a proper batch number of articles is ready to be processed.

Other industries have similar conveying situations. The batch or accumulated group of articles may be held until the next succeeding process station has been cleared to accommodate them. Alternately, the accumulating period may be for the sole purpose of achieving a sufficiet number of articles to make the next process step efficient. The number of needed accumulation areas varies with the particular industry and process in which the apparatus embodying the invention is to be used.

The invention contemplates apparatus for handling articles which comprises a plurality of preferably parallel accumulator conveyors, each having a receiving, an accumulating and a discharge section. Each of the plurality of conveyors is adapted to receive different pre-selected ones of the articles. Each section of each conveyor has driving means and first sensing means for registering the presence of articles on the conveyor. Each conveyor has second sensing means for registering the number of articles discharged therefrom. A movable stop is associated with each conveyor between its accumulating and discharge section. First control means for selectively releasing the respective stop means of the several conveyors to release the articles in the accumulating sections may be adjacent or remote from the conveyors themselves. The first control means releases the respective stop means of the several conveyors so that articles may move from the accumulating sections to the discharge section of each conveyor. The first control means is connected to the first sensing means so that the first control means is not operable until the first sensing means registers a predetermined number of articles in a particular accumulating section which is to be discharged. Second control means for selectively re-setting the respective stop means of the several conveyors is operable when the second sensing means counts a given number of articles released from the accumulating section of the respective conveyor.

The preferred embodiment of the invention has two or more accumulator conveyors. Preferably means are provided so that selected ones of the accumulator conveyors are preferentially discharged. For instance, articles allocated to a particular accumulator conveyor may predominate in number on the input conveyor. It is preferable that the particular accumulator conveyor be discharged each time its first sensing means registers the presence of a requisite batch number in the conveyor. This is in preference to a rigid sequential discharge of each of the accumulator conveyors in the accumulator apparatus.

Although it is possible for the accumulator apparatus of the invention to operate in response to manually loaded articles, such operation is most inefficient and loses most of the advantages inherent in mechanized conveyor systems. Therefore, the accumulator apparatus of the invention is preferably used in conjunction with an input conveyor and selecting apparatus such as that described in my co-pending application Serial No. 768,395 filed October 20, 1958, now abandoned, and entitled, Selecting and Transfer Apparatus for Conveying Articles. That application is concerned with an input conveyor and selector and transfer mechanism for moving articles from the conveyor to output stations such as the accumulator conveyor of the present application. The basic operation of the apparatus of my co-pending application is described later on in the present application to illustrate the utility of the apparatus embodying the invention of the present application.

The sensing means for registering the presence of articles on each accumulator conveyor is preferably a spaced pair of electrical switches connected to the first control means. The two switches indicate a particular number of articles in the accumulator section of the conveyor when they are simultaneously closed. The switches are located from the downstream end of the accumulator section a distance equal to a certain number of articles. When sufficient articles have been accumulated so that the last article continuously depresses the first elctrical switch, the entry of a subsequent article into the conveyor section and into contact with the second switch indicates to the first control means that a sufficient number of articles is in the accumulator section.

The stop means located between the accumulator section and discharge section of each accumulator conveyor embodies a unique inventive principle. A stop roller is held in position above the level of the conveyor to preclude further travel of articles along the conveyor past the stop roller. The roller is mounted on pivotally supported arms. The arms extend horizontally from the pivots and then upwardly to the stop roller. The arms are counterbalanced so that the weight of the stop roller is insufficient to swing the arm and roller below the level of the conveyor. However, pressure of articles against the stop roller overcomes the balanced condition. A solenoid-operated check roller bears against the roller support arm and normally prevents articles from depressing the stop roller. The solenoid is actuated and removes the check roller when coincidence is achieved between the previously described first sensing means of the particular conveyor and the imposed conditions in the first control means.

Each stop roller is counterloaded to swing upwardly into stop position after each article passes over it. It is successively depressed by each succeeding article. Each time a stop roller is depressed, the support arm contacts a counter. Pulses from the counter operate a stepping switch preferably a part of the first control means to record the number of articles discharged from the accumulator section of the accumulator conveyor.

Each accumulator conveyor is preferably comprised of a series of tubular rollers. The preferred embodiment of the accumulator apparatus is one in which every other roller is a driven roller. The intermediate or non-driven rollers are located vertically so that the top of the intermediate roller is slightly below the level of the driven roller. This has the effect of increasing the drive power of each of the drive rollers.

The preferred embodiment of the invention utilizes a unique roller chain and sprocket drive system for the driven rollers of the conveyor. The rollers of the receiving and accumulating sections of each accumulator conveyor are preferably driven at the same speed. The rollers beyond the stop means separating the accumulating section from the discharge section are driven at a high speed relative to the rollers of the accumulating and receiving sections. All sections are preferably driven from a single motor.

Each driven roller, regardless of its speed, has a sprocket fixed thereto. A conventional roller drive chain is in mesh with each driven roller sprocket. The meshing engagement is preferably insured by a chain guide strip along which the roller chain moves. Therefore, the so-called "working" length of the roller chain is maintained in a straight line which is more efficient in imparting power to the sprockets of the driven rollers. The return or non-working length of roller chain is not guided.

The spacing between driven rollers is such that the roller chain depends from the sprockets of the driven rollers in a catenary curve. The roller diameters and sprocket sizes are carefully calculated to correlate with the space between rollers. If this is not done, the curved chain length between adjacent sprockets would strike an idler or intermediate roller and interfere with the catenary fall of the chain. The described roller chain pattern has been found to deliver more power and increase chain life.

The principle embodied in the structure of the stop means between the accumulator and discharge sections of each conveyor of the total accumulator allows smaller solenoids to be used to control the stop mechanisms. Each solenoid need only be strong enough to move the check roller from the stop roller support arm. This is in contrast to the conventional system of employing the solenoid to move the total mass of the stop mechanism. Additionally, the counter loaded support arm of the stop means is ideally adapted to the simple counter mechanism employed. Each of these factors contributes to the economy of the overall system when the number of stop and counter mechanisms is considered.

These and other advantages of the invention are apparent in the following detailed description and drawings in which:

FIG. 3 is a fragmentary elevation partly in section of the selector apparatus;

FIG. 4 is a fragmentary sectional elevation taken along line 4—4 of FIG. 1 and illustrating the preferred transfer means for moving articles from the input conveyor to the accumulator apparatus of the invention;

FIG. 5 is a fragmentary sectional elevation taken along line 5—5 of FIG. 4;

FIG. 6 is a fragmentary sectional elevation taken along line 6—6 of FIG. 1 and illustrating the sensing means for registering the presence of articles on an accumulator conveyor;

FIG. 7 is a fragmentary plan view of a discharge section of the accumulator and the stop means of the accumulator sections;

FIG. 8 is a detailed sectional elevation of the stop means and counting means and taken along line 8—8 of FIG. 7;

FIG. 9 is a schematic wiring diagram of the electrical control system for the accumulator apparatus;

FIG. 10 is a schematic sectional elevation of the drive system for the conveying rollers of the accumulator;

FIG. 11 is a sectional elevation taken along line 11—11 of FIG. 7 showing the drive system for the discharge section of the accumulator conveyor.

Figure 1:
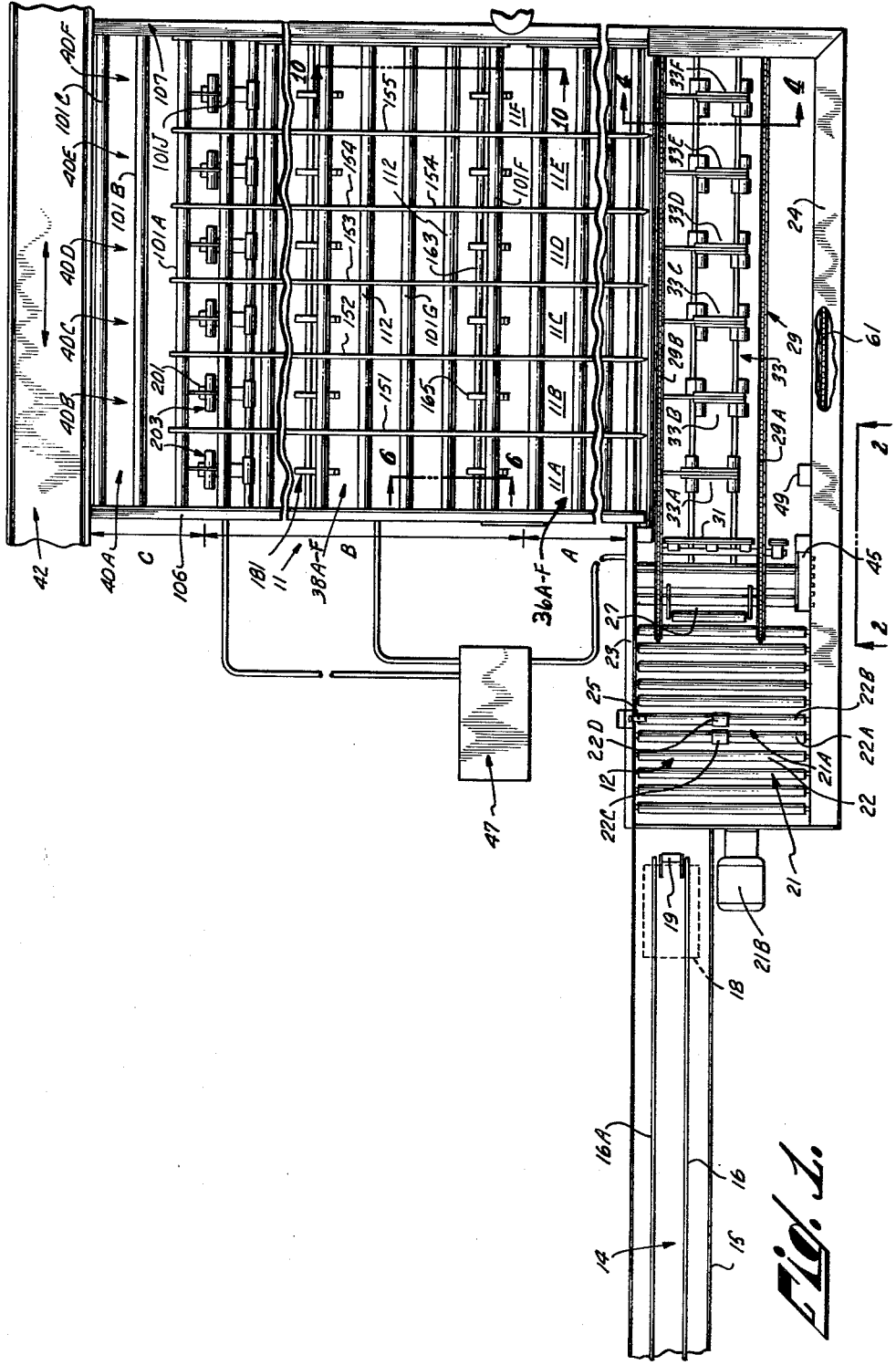
FIG. 1 is a schematic plan view of an input conveyor and selector mechanism and a battery of accumulator conveyors in accordance with the invention.

FIG. 1 illustrates an accumulator 11 in accordance with the invention and used in conjunction with an article selecting and transferring apparatus 12 substantially similar to the apparatus illustrated and described in my previously mentioned co-pending application. A feed conveyor 14 having a framework 15 and parallel roller chain conveyors 16, 16A conveys articles such as a produce box 18 shown in dotted lines on the feed conveyor and abutting against a stop bar 19.

The feed conveyor supplies articles to an input conveyor 21 which has a box turning section 21A which comprises a multiplicity of conveyor rollers 22 extending between a framework member 23 and a box housing 24. Framework member 23 also supports the input end of accumulator 11, and a conveyor roller drive motor 21B.

The box turning section has two adjacent conveyor rollers 22A, 22B whose midportions are thickened by collars 22C, 22D fastened to the rollers. A box or other article released by stop bar 19 onto the conveyor rollers strikes a turning tab 25 as it progresses. The rollers 22 are driven rollers. Rollers 22A and 22B are thickened so that the end of the article fed into the box turning section strikes the collar and is accelerated with respect to the end of the box striking the tab. Thus, the box is substantially re-oriented before it reaches a second stop bar 27 which lies at the beginning of an input conveyor section 29. A lock bar 31 stretches between conveyor chains 29A, 29B at a point just prior to a first transfer assembly 33A of a multiple transfer component 33. The component 33 has a plurality of transfer assemblies 33A through 33F. The transfer assemblies are described in more detail later in conjunction with FIGS. 4 and 5.

The transfer means transfers articles from the input conveyor to the accumulator. Each transfer assembly is located adjacent to and in alignment with a conveyor of the accumulator. The illustrative accumulator has six such conveyors, 11A, 11B, 11C, 11D, 11E, 11F. Each of the accumulator conveyors 11A through 11F has a receiving section 36A through 36F respectively. Each has in addition an accumulating section 38A through 38F, respectively and a discharge section 40A through 40F, respectively. Articles transferred from the input conveyor to an accumulator conveyor traverse in order the receiving, accumulating and discharge sections. The extent of these sections is indicated by the dimension lines A, B and C of FIG. 1.

All of the accumulator conveyors discharge onto a reversible conveyor belt 42. The belt is exemplary only. The ultimate destination and disposition of the articles discharged from the accumulator will of course vary with the type of article and the processing steps involved.

The transfer means move objects from the output conveyor to selected ones of the accumulator conveyors in response to the operation of a selecting mechanism 45. The preferred selector mechanism is that described in detail in my co-pending application previously referred to. The selector mechanism is electrically coupled with a control console 47 which may be placed in any convenient location visible to the operator. An additional component of the semi-automatic control apparatus of the preferred accumulator is a priority switch mechanism 49 mounted to box housing 24 adjacent selector mechanism 45.

The selector mechanism is shown in some detail in FIG. 3. A plurality of control buttons 51 protrude from the outboard face of a selector case 53. Each control button is joined by a link assembly 54 to a cam rod 56. The motion of the cam rods is controlled in part by solenoids 58 and 59. The solenoids are a portion of an interlock system which forms no part of this invention and is therefore not described in detail.

Figure 2:
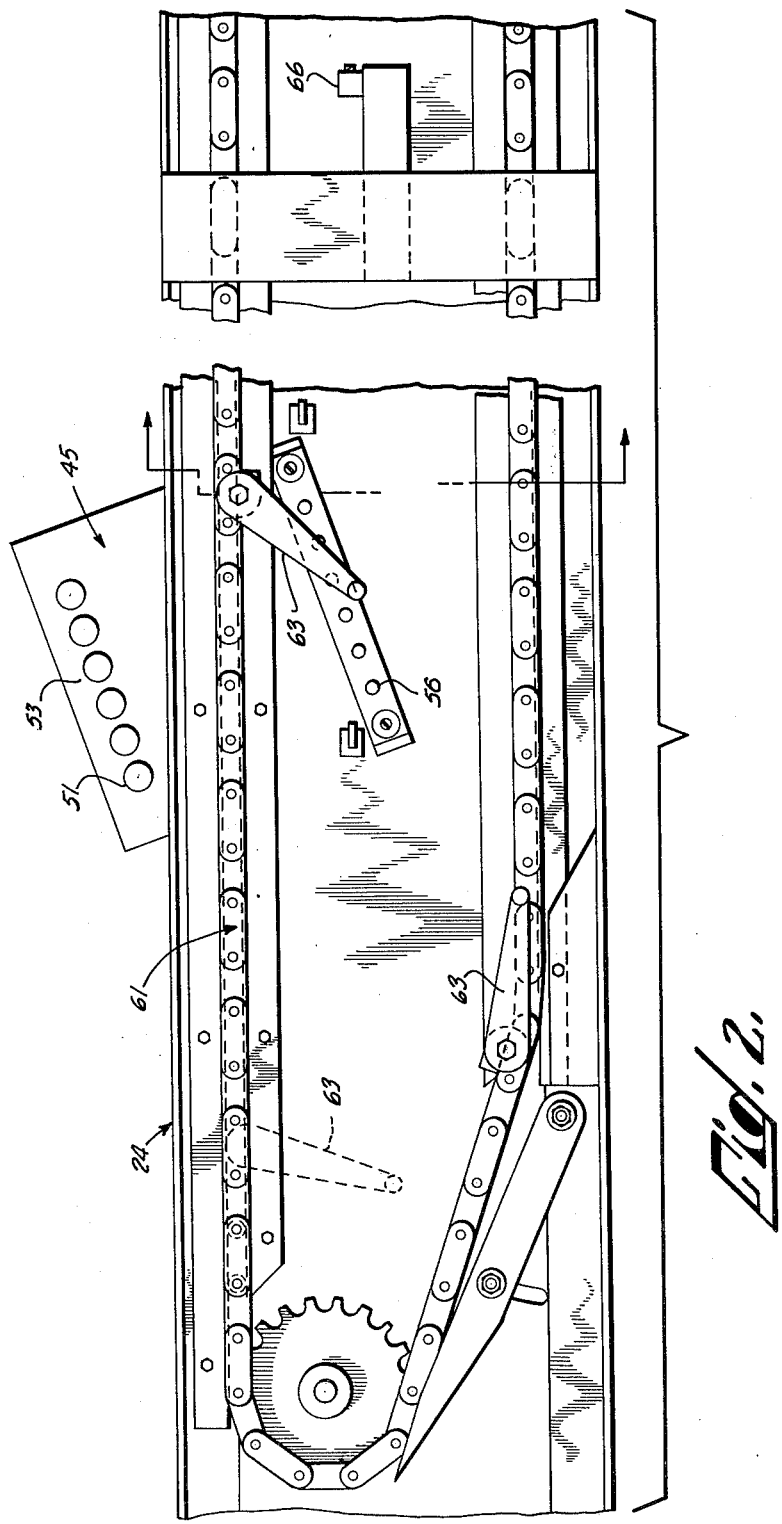
FIG. 2 is a fragmentary elevation partly broken away taken along line 2—2 of FIG. 1 and showing the basic mechanism of the selector apparatus used with the embodiment of FIG. 1.

The cam rods protrude interiorly of box housing 24 (see FIG. 2). The box housing shields a roller chain carrier 61 which carries a plurality of indicators 63 spaced at regular intervals along the extent of the chain conveyor. The chain carrier is co-extensive with and synchronized with the chain conveyor section 29 of input conveyor 21. Therefore, the path of the indicators is synonymous with the path of the articles on the input conveyor. The operator of the selector mechanism pushes one of the control buttons 51 and a cam rod 56 is thereby impelled into the path of an indicator carried by chain carrier 61. The indicator is oriented by passing over the protruding cam rod. Each indicator passing through the zone of the cam rods may be oriented by passing over any of the cam rods.

Each cam rod gives an indicator a different orientation. The orientation selected depends upon the transfer assembly which is desired to be activated. A plurality of limit-switches like limit-switch 66 of FIG. 2 are variously positioned to coincide with the path of an indicator in a particular orientation. Thus, a limit-switch 66, associated with transfer assembly 33A, is struck and tripped by an indicator when that indicator has been oriented by the lowest cam rod of the selector mechanism.

Transfer assembly 33A is illustrated in FIG. 1 in actuated position. An article carried by input conveyor section 29 is transferred to accumulator conveyor 11A by the actuated transfer assembly.

The operation of the transfer means is best described in conjunction with FIGS. 4 and 5.

In FIG. 4 transfer assembly 33F is shown in rest position. The actuated position of the transfer assembly is indicated by the phantom lines 71, 72. Each of the transfer assemblies is identical. Each comprises two substantially similar friction roller pairs 74, 75 and 76, 77. Each roller pair is pivotally mounted to a support arm. Rollers 74, 75 are supported by an arm 81. Rollers 76, 77 are supported by a substantially identical arm 83. Support arms 81, 83 are journalled on driven shafts 85, 86 respectively. The two driven shafts support all of the transfer assemblies. Each driven shaft has a plurality of sprockets 88, one fixed adjacent each roller pair support arm. A roller chain 91 links each sprocket 88 to a roller sprocket 92 fixed to an axle 93 on which the friction rollers are mounted to the support arm. Thus, the driven shafts not only support the friction rollers but impart motion to them.

Support arms 81 and 83 of each transfer assembly extend below the driven shafts. At a point remote from the driven shafts the support arms are pivotally fixed at spaced points to a pantograph arm 95. The pantograph arm is linked by a strap 97 to an actuating solenoid 99. When the solenoid is actuated the solenoid arm is pulled leftwardly in FIG. 4 and as a consequence the support arms and the friction rollers assume the position indicated by phantom lines 71 and 72. This is the transferring position. When solenoid 99 is actuated the rollers contact the bottom surface of an article on conveyor 29 and transfer that article from the conveyor to the accumulator. As previously described, the selector mechanism dictates which of the transfer assemblies will be activated and thus dictates which accumulator conveyor receives the article from the input conveyor.

Each of the receiving, accumulating and discharging sections of the accumulator conveyors comprises a plurality of spaced parallel conveyor rollers. There are two types of conveyor rollers. Each section is made up in part of driven rollers 101. The discharge section comprises three driven rollers 101A, 101B, 101C. While each of the accumulator conveyors can be constructed with independent roller conveyors, it is preferable to extend single conveyor rollers across the entire width of the accumulator between longitudinal framing members 106, 107. The roller driving mechanism may thereby be reduced to a single system instead of being duplicated for each of the accumulator conveyors necessary in a particular operation.

In the receiving and accumulating sections of each accumulator conveyor an idler roller 112 extends between framework members in the interval between adjacent pairs of driven rollers. The top surface of each idler roller is a fraction of an inch lower than the tops of the adjacent driven rollers. An article conveyed by rollers arranged thusly may be moved speedily with less power than if all of the rollers are driven or if all of the rollers constituting the conveyor are of the same height.

The extent of any of the component sections of the accumulator is of course determined by the size and number of articles which are to be accumulated therein. The spacing of the conveyor rollers is also determined by the size of the articles. However, the roller spacing may be modified within the limitations imposed by article size to meet the requirements of the inventive principle embodied in the conveyor chain apparatus disclosed herein.

The driven conveyor rollers are preferably chain and sprocket driven. Referring now to FIG. 10, each end of each conveyor roller, whether idler or driven roller, is rotatably mounted to the accumulator framework. Each driven roller has a chain sprocket 115 attached to one of its ends adjacent framework 107. The driven rollers of the receiving section of the accumulator are driven by a chain 117. The driven rollers of the accumulating section are driven by a chain 118. A chain 119 drives the rollers of the discharge section. All of the chains are driven by an electric motor 121 mounted to framework member 107. The motor drives a sprocket 123 which is part of a chain and sprocket assembly 125 turning a first roller conveyor 101F of the accumulating section. A short roller chain 127 loops about a second drive sprocket 128 on conveyor roller 101F and a larger driven sprocket 129 on a second driven conveyor roller 101G of the accumulating section. Outboard of sprocket 129 a secondary drive sprocket 131 is fixed to conveyor roller 101G. Roller chain 118 of the accumulating section is driven by sprocket 131.

As can be seen from FIG. 10, a guide rail 135 supports chain 118 in mesh with the bottom portion of each roller sprocket. Likewise, roller chain 117 of the receiving section is held in mesh with the top portion of each drive sprocket by a guide rail 137. The bottom or returning portion of chain 117 is supported by a return rail 138. The return portion of chain 118 is confined by an upper guide rail 139. Similar guide rails 141, 152 define the paths of roller chain 119 of the discharge section of the conveyor (see FIG. 11).

The guide rails form a part of the apparatus embodying the inventive drive chain arrangement disclosed herein. In the case of the drive chain for the accumulator section the bottom guide rail not only insures that the chain is kept in mesh with each of the drive sprockets but supports the drive portion of the chain in a substantially straight line. The sprocket size, the chain size and the roller spacing is such that a number of links evenly spans the straight line distance from center to center of each driven roller. Thus, the working portion of the drive chain has no slack. The chain can be of a less sturdy size and still deliver the requisite amount of power because changing load requirements do not impose breaking loads on the slackless chain.

The necessary slack in any drive chain is confined in the invention to the return or non-working portion of the drive chain. As can be seen in FIG. 10, the return portion of drive chain 145 falls in a natural catenary loop 145 between adjacent drive sprockets. In order that the sprocket mesh properly with the chain, the sprocket size and the roller spacing is such that the catenary loop is defined by an even number of roller chain links.

The power saved by utilizing smaller lighter drive chains is reflected in the size of the electric motor 121. It is possible by utilizing the apparatus in accordance with the invention to drive the entire battery of accumulator conveyors from a single motor, including the conveyor rollers of the receiving section. The linkage between the drive system of the accumulating section and the receiving section is achieved by means of sprockets (not shown) placed on the like ends of the first roller of the accumulating section and the last roller of the receiving section outboard of framework member 106 (see FIG. 1). The sprockets are chain linked and of such a diameter that the accumulating section driven rollers rotate at a slower speed than the receiving section driven rollers.

FIGS. 6, 7 and 8 illustrate the article sensing apparatus located between the conveyor rollers of each accumulator conveyor. The sensing means of FIGS. 6, 7 and 8 are linked electrically in a manner to be described in conjunction with the description of FIGS. 9 and 12. FIG. 6 which is a fragmentary sectional elevation shows a plurality of the driven rollers 101 and idler rollers 112 in the accumulating section of conveyor 11A. A dividing rail 151 separates conveyor 11A from conveyor 11B. Similar dividing rails 152, 153, 154, 155 separate each of the remaining accumulator conveyors (see FIG. 1). The dividing rails are supported upon a plurality of upright plates 157 rising from channel braces 158 which extend between accumulator framework members 106 and 107. One channel brace 158 supports a mounting platform 161 beneath the accumulating section of each of the conveyors. A journal support 162 extends above the mounting platform at the downstream side of the platform. A pivot shaft 163 is held in the journal support. A curving sensing lever 165 is pivotally mounted intermediate of its length to pivot shaft 163. Extending upwardly from the point of attachment to the pivot shaft is a curved contact area 166. The sensing lever extends downwardly and rearwardly from the pivot shaft and then bends into a substantially horizontal counterbalance portion 167. An additional counterweight 168 is fixed to the end of the lever remote from the pivot shaft.

Contact portion 166 is held in a position above the level of the conveyor rollers by an extension spring 171. A limit screw 172 threadably engaged in the mounting platform and held by a lock nut 173 limits the downward swing of counterbalance portion 167 of the lever.

A normally closed limit-switch 175 is secured to the mounting platform. A contact 177 of the limit-switch extends upwardly toward the bottom surface of the sensing lever. The counterbalance portion of the sensing lever aided by extension spring 171 normally depresses contact 177 so that the limit-switch is held open. An article passing over the sensing lever lifts counterbalance portion 167 from the contact 177, permitting the limit-switch to close.

A second sensing lever 181 located upstream from the first sensing lever a distance equal to the total length of an article on the conveyor is similarly pivotally suspended above the mounting platform by a pivot support 182. The second sensing lever pivots on a pivot shaft 183. The sensing lever itself is similar in all respects to sensing lever 165, having a counterbalance section 187 and an additional counterweight 188. The second sensing lever is pulled downwardly by an extension spring 191 against a limit screw 192. The counterbalancing section of the second sensing lever depresses the contact of a limit-switch 193 which is hooked in series with limit-switch 175 through a conduit 194. Like limit-switch 175, the limit-switch of the second sensing lever is a normally closed limit-switch held in open position by the counterbalance section of the second sensing lever. The limit-switch closes when an article passes along the conveyor and depresses the sensing lever.

The paired limit-switches of the sensing levers act in concert with a stop bar solenoid 201. There is a stop bar solenoid in each of the accumulator conveyors of the accumulator proper. Each conveyor has a stop bar 203. The stop bar is held normally in the path of articles conveyed on a support arm 205 pivotally secured to a sleeve 206 mounted about a cylindrical pivot bar 207 which extends between framework members 106, 107 of the accumulator. All of the stop bar support arms of the accumulator conveyors are pivotally mounted about cylindrical bar 207. If the transverse extent of the accumulator is too great for such mounting, the stop bar support arms may be individually mounted by other more conventional means. However, in the illustrative embodiment the transverse extent of the six accumulator conveyors is not great enough to preclude the preferred illustrated mounting.

The support arm has a vertically extending member 209. A stub axle 211 extends transversely of the conveyor on either side of the vertical portion. A separate roller 212, 213 is pivotally mounted on the axle of each support arm. The stop bar, therefore, rolls easily when an article urged by the conveyor bears against it. A spring 214 extends from a tongue 215 of the support arm opposite the journal from the stop bar to brace 158A. The spring has a counterbalancing effect which overcomes the weight of the opposite support arm portion and the stop bar. Thus, normally the stop bar projects between conveyor rollers 101A and 101J into the path of conveyed articles. The position of the stop bar which precludes further passage of articles along the conveyor is maintained by a check roller 216, which contacts a lower surface of the stop bar support arm. The check roller is mounted on a lever arm 218 pivoted remotely from the check roller by a pivot mount 219 fixed to a support plate 221 which cantilevers outwardly from a framework bracing channel 158A. The solenoid 201 is also mounted to this channel brace.

Intermediate the check roller lever a pivot pin 223 links a solenoid strap 225 to the check roller lever. The strap extends from the pivot pin to the armature of solenoid 201. Thus, when solenoid 201 is actuated the check roller lever swings about pivot 219 pulling the check roller from beneath the support arm of the stop bar. Without check roller 216 in supporting position, the continuously urged articles on the conveyor can overcome the effect of counterspring 214 and pivot the stop bar downwardly about cylindrical bar 207 and override the stop bar. Therefore, articles may be discharged from the accumulating section of the conveyor which is defined at one end by the stop bar as long as solenoid 201 of the respective conveyor is actuated.

A counter switch 231 which is normally open is associated with the stop bar of each conveyor. Each counter switch is supported by a transverse support strap 233 which in turn is held at the end of the plates 221. Counter switch 231 has a contact screw 235 extending upwardly toward the respective support arm. The height of the contact screw is adjustable. A return spring 237 for the check roller lever extends between the contact screw and a mounting hole 239 in the end of solenoid strap 225. Spring 237 returns the check rollers to supporting position beneath the stop bar support arm when solenoid 201 is de-activated. This de-activation takes place when the counter switch has registered a given number of encounters with the support arm as it is depressed with each conveyed article passing over the stop bar.

Each article which is discharged from a conveyor passes over a stop bar and is sensed by the counter switch associated with the respective conveyor. Discharged articles enter the discharge section of the respective conveyor at the speed given them by the driven rollers 101H and 101J of the accumulating section. However, due to the gearing ratio described in conjunction with the description of FIG. 11, the articles discharged are accelerated by the driven rollers 101A, 101B, 101C of the respective discharge section. The acceleration is necessary to impel the discharge articles on the conveyor belt 42 at proper intervals thereon. The articles are reoriented 90° both by the speed of belt conveyor 42 acting differently on the first discharged end of an article and by vertical roller posts 251, 251A (see FIG. 11) which a discharged article strikes depending on the direction of travel of conveyor 42.

The speed of the discharge sections of each accumulator conveyor is identical in the illustrative embodiment. This is true because the driven conveyor rollers extend across the accumulator in each conveyor. Since the receiving and accumulating sections are made in the same fashion, the conveyor roller speeds in each of the accumulating and receiving sections of the conveyors are identical. Although in the embodiment of the accumulator disclosed in this application the roller speeds of each of the accumulator section are different, processing conditions may dictate similar speeds for two or all of the sections. However, in the usage for which the illustrative embodiment was designed, it is preferable to have a receiving section speedy enough to convey articles promptly from the transfer means and a discharge section which operates to move articles rapidly from the accumulating section.

Idler rollers are used between most adjacent pairs of driven conveyor rollers in the accumulating and receiving sections to lessen the accumulative force brought to bear on the stop bars by driven rollers spinning against the bottom surface of all of the conveyed articles held in place by the stop bar despite the continuously rotating driven rollers. The idler rollers help support the articles without imparting further load against the stop bar.

Preferably the idler rollers are located slightly lower than the adjacent driven rollers so that bowed articles will not tend to rest upon alternate idler rollers and not be driven at all.

Figure 12:
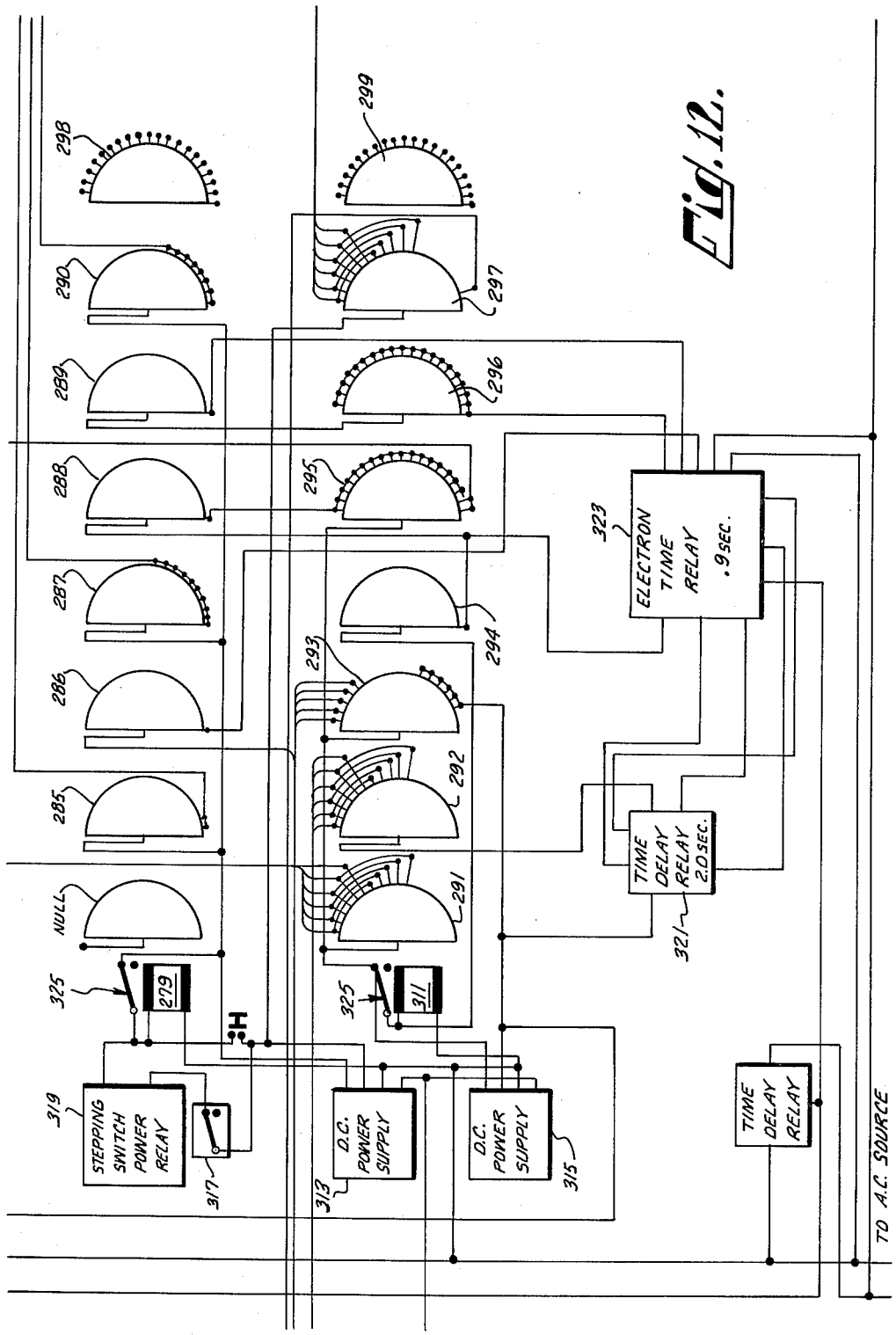
FIG. 12 is a schematic wiring diagram showing in more detail the counting means of the electrical system of FIG. 9.

The illustrative embodiment shows a specific use for the accumulator of the invention. The receiving belt conveyor 42 is reversible so that it may deliver discharged articles to one of two processing stations. These stations may be object stackers. The electrical control apparatus illustrated in FIGS. 9 and 12 is designed to be used with an accumulator supplying articles to stackers fed from a belt conveyor such as conveyor 42. Each of the stackers (not shown) is capable of adjustment to stack articles to a height of nine or ten or eleven or twelve articles. Therefore, the circuitry of FIGS. 9 and 12 provides for accumulating and discharging batches of accumulated articles to accommodate each of these different stack heights.

The six accumulator conveyors 11A through 11F are represented by parallel dotted lines running across the top of FIG. 9. Near the input or leftward end of the conveyors are the schematic representations of the paired limit-switches 175, 193 which sense for each accumulator conveyor the presence of a sufficient number of articles to supply a particular stack height. The solenoids 201 are schematically represented at the discharge end of the accumulator conveyors. These are the solenoids which remove check rollers 216 from supporting position with respect to stop bars 203 of each conveyor. Adjacent the solenoids are second limit-switches 231 which constitute the sensing part of the counting means of the accumulator. These counting means are actuated by the depressed support arm of the respective stop bars. As described in conjunction with FIG. 8, this actuation takes place whether the conveyed article depresses the stop bar against the bias load of extension spring 214 or whether the spring is replaced by increasing the weight of tongue 215 to counterbalance the stop bar and support arm. Use of the extension spring is preferable since the stop arm returns to impeding position more quickly when urged by the spring.

Each of the solenoids 201 is actuated by a holding relay 261 through 266. The operation of the holding relays is controlled in part by one of a plurality of sensing relays 271 through 276. The sensing relays are controlled in part by the respective pairs of first normally open limit-switches 175, 193. The sensing relays cannot be normally actuated until switches 175, 193 of a pair in a particular conveyor are depressed by articles in place above them. When a coil of a sensing relay is actuated by simultaneously closed switches 175, 193, a circuit is closed which enables the advancing solenoid 279 of a multiple stepping switch 281 to be energized and the stop bar for the conveyor involved to be released through energization of its solenoid 201 if other conditions of the control system are met. Subsequent operation of the stepping switch 281 is in part determined by a second multiple stepping switch 283. The two multiple stepping switches are illustrated in detail in FIG. 12 along with the relays and power supplies which move the individual contact brushes of the various multiple stepping switch banks.

For the particular installation illustrated two eight-bank stepping switches are used. The first bank of stepping switch 281 is a null. The last or eighth banks of both stepping switches are used to light bulbs in control solenoids 47 which indicate to the selector mechanism operator when a particular accumulator conveyor has accumulated a sufficient number of articles to be dischargeable. These panel light banks have been eliminated from FIG. 9 to save space and the electrical connections for the panel lights have not been shown in FIG. 12 because that circuitry forms no part of the invention.

The active banks of the first stepping switch are banks 285, 286, 287, 288, 289 and 290. These banks are designated respectively as double nine count bank, priority bank, eleven count bank, homing bank, re-cycle bank, and twelve count bank. The count banks refer to the stack heights of the stackers which are supplied from the accumulator. The priority bank is part of the circuitry which controls the accumulator conveyor which will be preferably discharged each time its article sensing means indicate a sufficient number of articles in the conveyor. The homing and re-cycle designations will be apparent in the further description.

The active banks of the second multiple stepping switch are sensing bank 291, channeling bank 292, priority bank 293, holding bank 294, homing bank 295, re-cycling bank 296 and stack height bank 297. As previously described, the eighth bank 298, 299 of the stepping switches are controls for the panel lights.

In the specific control apparatus each accumulator conveyor may discharge its product at one of the two stackers. When the function of each conveyor is initially assigned to pull toggle switches at the control console are positioned to indicate the stacker at which the articles from the conveyor will go. For this purpose a plurality of stacker selector switches 301 through 306 are connected to the stepping switches. In FIG. 9 all of the stacker selector switches are oriented to send the articles from the conveyors to stacker number one. The toggle switches are all connected in series with a stacker height switch. For instance, all of the upper poles of the selector switches are connected to a stacker switch 308 associated with a stacker number one. The lower poles of the selector switches are all connected to a stacker switch 309 associated with stacker number two. The stacker switches have a plurality of contact points which represent the desired stack height. Each contact point of each stacker switch connects to one of the count banks of the first multiple stepping switch.

The contact brushes of all of the banks of the second stepping switch are advanced by a solenoid 311. Both stepper switch relays 279 and 31 operate on D.C. current from power supplies 313, 315 respectively. The flow of power to stepping switch relay 279 is metered by a microswitch 317 controlled by a time delay relay 319. Solenoid 311 of the second stepping switch is actuated in response to a time delay relay 321 controlled in turn by an electron timer 323.

The contact brush advancing solenoids of each stepping switch seat a contact brush rachet (not shown) when the solenoid is actuated. A normally closed switch 325 is opened when the respective relay is actuated. When the solenoid turns off, the switch again closes and advances the contact brush.

Each of the sensing relays 271 through 276 controls two switches. The lower switch 331 associated with each sensing relay is a normally open switch. The second switch 333 is a normally closed switch. All of the normally open switches are connected to the priority bank of the second stepping switch. The sensing relays may control a third switch controlling the panel lights which indicate which of the accumulator conveyors has a sufficient number of articles in it. This circuitry is not illustrated. First stepping switch solenoid 279 receives a pulse each time any of the limit-switches 231 is closed by an article depressing a stop bar. Each depression of the stop bar advances the contact brush of all eight banks of the first stepping switch one increment. A complete cycle of the preferred stepping switch continues twenty increments. The counting banks of the first switch are wired so that either eighteen, eleven or twelve counts must be received before the stepping switch starts to recycle. For instance, the eleven count bank 287 which is conditioned to be read by the stacker switch sensing a signal to the electron timer relay 323 when eleven pulses have advanced its contact brush. In addition to deactuating the sensing coil so that the holding coil associated with the solenoid 201 of the particular conveyor track is de-energized to re-lock the stop bar, the electron timer activates solenoid 311 to advance the second stepping switch. The contact brush of the sensing bank 291 of the second stepping switch advances until it "finds" contact point which is wired by means of loom 341 to the normally closed switches 333 of the sensing relays. The electron timer is wired in series through the switches 333. It will not pulse when an open switch 333 is "found." A switch 333 is only open when a sensing coil or relay is energized by the presence of a sufficient number of articles in the particular conveyor at the sensing relay.

Normally the sensing bank scans the accumulator conveyor in order, actuating the discharge controls and each full conveyor as it comes across it. As the contact brush for the sensing bank advances in its search the contact brush for the channel bank of the second stepping switch also advances. Each of these banks is wired so that contact points 1 through 5 are not parallel with contact points 7 through 11. Contact point 6 is independently coupled to the outer circuitry. The channeling bank is the power switch for the holding coil. It dwells on the contact point representing a particular conveyor of the accumulator when the contact brush of the sensing bank finds an open switch 333. The channeling switch is linked in series with the normally open holding relays. Power traversing the channeling bank actuates the holding relays which energize the solenoids 201 which unlock the stop bars. The channeling bank is also in series with the counting switches so that current flows through time delay relay 321, channeling bank 292, the holding relays and the counting switches to relay 319 which pulses power to the solenoid 279 advancing the first stepping switch. Therefore, the number of articles passing through the discharge section of the lane indicated by the contact brush of the sensing bank is summed by the particular count bank selected by the proper stacker switch. The holding relays close second switches sending power through electrical leads 351, 352 to reverse the direction of belt conveyor 342 in accordance with the stacker selected to be fed by the particular accumulator conveyor being discharged.

The normal sensing sequence may be altered by repositioning priority switch 49. The priority switch works on a progressive shorting basis. If conveyor 4 is selected by the priority switch positions 1, 2, 3, and 4 are shortened so that power continues to electron timer 323 and hence time delay relays 321 and the second stepping switch continues until the condition of conveyor 4 is sensed by sensing bank 291. Each time a conveyor is discharged, the priority switch causes the sensing bank contact brush to bypass the contacts representing other conveyors until it first senses the condition of the selected conveyor number 4. The article sensing switches 175, and 193 of conveyor 4 (11D of the illustrative embodiment) are both closed conveyor 4 will be discharged. If the switches are not closed, the contact brush of the sensing bank will progress to the contact point representing conveyor 5 (11E of the illustrative embodiment). If conveyor 5 is in condition for discharge, its stop bar will be unlocked and the articles discharged therefrom. After this and any subsequent discharge of a conveyor the circuitry will cause the sensing bank to seek out a condition of conveyor 4 before any other conveyor is discharged.

In addition to the apparatus for automatically discharging conveyors as they contain the requisite number of articles, a plurality of cleanout switches 361 through 366 supply closed circuits which unlock the stop bar of any chosen conveyor and causes the discharge of the articles thereon.

The accumulator of the invention provides for short term storage of a multiplicity of differing articles whether the difference between the articles is in their nature or in the process step for which they are subsequently destined. The number of conveyors which may be batteried within a single accumulator is flexible. Accumulator length is easily varied to accommodate different sized articles. The apparatus sensing the presence in a particular accumulator conveyor of a number of articles may be arranged at any desired point with respect to the head article in the conveyor. The illustrative embodiment shows each accumulator conveyor to be substantially identical in its arrangement. It need not be. Apparatus embodying first sensing means may be located differently within each accumulator conveyor so that the number of articles required to condition the conveyor for discharging may differ. While a semi-automatic electrical control system has been illustrated the accumulator well may be operated by manual controls. Transfer means of a particular type are not necessary to the operation of the accumulator. The accumulator may be fed manually at a great loss in efficiency. The input conveyor and the transfer means illustrated may be replaced by individual conveyors transferring articles to the accumulator at the command of control mechanisms.

The invention may be embodied in apparatus having any number of accumulator conveyors. The conveyors may be commonly or individually driven. If individually driven, they need not comprise parallel lanes but may diverge to fit the particular purposes for which they are designed. While conveyors comprising transverse rollers are preferable, belt or chain conveyors may be used in conjunction with the invention. The speed relationship of the various sections of the accumulator conveyors may be varied to meet differing conditions. Apparatus embodying the invention may vary to meet most of the differing conditions encountered in the conveying art. No particular type of article is precluded from the contemplation of the invention. The illustrative embodiment should not be considered to limit the scope of the invention defined in the appended claims.

I claim:

1. Apparatus for stopping the progress of articles on a conveyor comprising a stop bar, a journal mount, a stop bar support arm held by the journal mount so that the support arm extends horizontally on each side of the journal, the mass of the stop bar and the support arm being distributed with respect to the journal so that the stop bar swings freely into the path of articles on the conveyor, a check roller, a pivoted lever adapted to hold the check roller against the support arm so that the roller holds the support arm and the stop bar in the path of conveyed articles against the pressure thereof, and means for pivoting the lever to remove the check roller from holding position to enable the stopped article to swing the stop bar from the path of the article under the urging of the conveyor.

2. A stop barrier for a roller conveyor comprising a movably mounted arm disposed in the path of articles carried on the conveyor and adapted to be moved out of the path of the articles by the force of such articles contacting the arm, means for releasably locking the arm in the path of the articles carried on the conveyor, a plurality of driven rollers in the conveyor with their axes of rotation extending transversely of the direction of articles carried on the conveyor and having upper surfaces adapted to contact the articles, and a plurality of undriven idler rollers disposed intermediate the driven rollers with their upper surfaces below the level of a plane tangential to the upper surfaces of the driven rollers.

3. A combined stop barrier and article counter for a conveyor comprising a driven feed conveyor, a driven discharge conveyor aligned with the feed conveyor and operating at a greater speed than the feed conveyor whereby an article is accelerated as it moves from the feed conveyor onto the discharge conveyor to provide an open space between adjacent articles, a movably mounted arm disposed intermediate the feed conveyor and the discharge conveyor in the path of articles carried on the feed conveyor adapted to be moved out of the path of such articles by the force of such articles contacting the arm, means for normally biasing the arm into the path of articles carried on the feed conveyor when no article is contacting the arm whereby the arm is moved into the space between articles produced by the acceleration of an article moving onto the discharge conveyor, means for releasably locking the arm in the path of articles carried on the feed conveyor, and counting means actuated by movement of the arm as each article passes the arm for registering the number of articles moving from the feed conveyor to the discharge conveyor.

4. Apparatus as described in claim 3 wherein the feed conveyor is a roller conveyor which includes a plurality of driven rollers with their axes of rotation extending transversely of the direction of movement of articles carried on the feed conveyor and having upper surfaces adapted to contact the articles, and a plurality of undriven idler rollers disposed intermediate the driven rollers with their upper surfaces below the level of a plane tangential to the upper surfaces of the driven rollers.

5. A stop barrier for a conveyor comprising a driven feed conveyor, a driven discharge conveyor aligned with the feed conveyor and operating at a greater speed than the feed conveyor whereby an article is accelerated as it moves from the feed conveyor onto the discharge conveyor to provide an open space between adjacent articles, a movably mounted arm disposed intermediate the feed conveyor and the discharge conveyor in the path of articles carried on the feed conveyor and adapted to be moved out of the path of such articles by the force of such articles contacting the arm, means for releasably locking the arm in the path of articles carried on the feed conveyor, means for normally biasing the arm into the path of articles carried on the feed conveyor when no article is contacting the arm whereby the arm is moved into the space between articles produced by the acceleration of an article moving onto the discharge conveyor, wherein the feed conveyor is a roller conveyor which includes a plurality of driven rollers with their axes of rotation extending transversely of the direction of movement of articles carried on the feed conveyor and having upper surfaces adapted to contact the articles and a plurality of undriven idler rollers disposed intermediate the driven rollers with their upper surfaces below the level of a plane tangential to the upper surfaces of the driven rollers.

6. Apparatus for stopping the progress of articles being moved on a conveyor in a path from upstream on the conveyor to downstream on the conveyor, comprising a stop bar protruding into the path of the articles and extending from the path of the articles in a direction transverse to the direction of said path, a support arm fixed to the stop bar and disposed outside of the path of the articles in spaced relation from said path in a direction transverse to the direction of said path, the support arm extending upstream from the stop bar in a direction substantially parallel to the path of the articles, a pivot mount journalling the support arm for pivotal movement of the support arm about a pivot axis transverse to the direction of the path of the articles, said pivot axis being spaced from the path of the articles in a direction transverse to the direction of said path and being spaced upstream from the stop bar, spring means for biasing the support arm about the pivot axis with the stop bar normally disposed in the path of the articles, check means disposed in the plane of pivotal movement of the support arm at a position adjacent to the stop bar for supporting the support arm with the stop bar positioned in the path of articles against the pressure of articles on the stop bar, and actuating means for removing the check means from supporting the support arm to permit an article impinging upon the stop bar to swing the support arm about its pivot axis and remove the stop bar from the path of the article under urging of the conveyor.

7. Apparatus for stopping the progress of articles being moved on a conveyor in a path from upstream on the conveyor to downstream on the conveyor, comprising a stop bar protruding into the path of the articles and extending from the path of the articles in a direction transverse to said path, a support arm disposed outside of the path of the articles in spaced relation from said path in a direction transverse to the direction of said path and fixed to the stop bar, the support arm extending upstream from the stop bar in a direction substantially parallel to the path of the articles, a pivot mount journalling the support arm for pivotal movement of the support arm about a pivot axis transverse to the direction of the path of the articles, said pivot axis being spaced from the path of the articles in a direction transverse to the direction of said path and being spaced upstream from the stop bar, said pivot axis being spaced from the center of the combined mass of the stop bar and the support arm so that the support arm normally pivots freely about the pivot axis in a direction to dispose the stop bar in the path of the articles, check means disposed in the plane of pivotal movement of the support arm at a position adjacent to the stop bar for supporting the support arm with the stop bar positioned in the path of articles against the pressure of articles on the stop bar, and actuating means for removing the check means from supporting the support arm to permit an article impinging upon the stop bar to swing the support arm about its pivot axis and remove the stop bar from the path of the article under the urging of the conveyor upon the article.

8. A stop barrier for a conveyor comprising a driven feed conveyor, a driven discharge conveyor aligned with the feed conveyor and operating at a greater speed than the feed conveyor whereby an article is accelerated as it moves from the feed conveyor onto the discharge conveyor to provide an open space between adjacent articles, a movably mounted support arm having a stop bar disposed intermediate the feed conveyor and the discharge conveyor in the path of articles carried on the feed conveyor from upstream on the feed conveyor to downstream on the feed conveyor and adapted to be moved out of the path of such articles by the force of such articles contacting the stop bar, means for releasably locking the support arm with the stop bar disposed in the path of articles carried on the feed conveyor, means for biasing the support arm with its stop bar normally disposed in the path of articles carried on the feed conveyor when no article is contacting the stop bar whereby the stop bar is moved into the space between the articles produced by the acceleration of an article moving onto the discharge conveyor, said stop bar extending from the path of the articles transversely to said path, said support arm being disposed outside of the path of the articles and being fixed to the stop bar, said support arm extending upstream from the stop bar in a direction substantially parallel to the path of the articles, said support arm being movably mounted by means for journalling the support arm for pivotal movement of the support arm about a pivot axis transverse to the direction of the path of the articles, said pivot axis being spaced from the path of the articles in a direction transverse to the direction of said path and being spaced upstream from the stop bar, and said means for releasably locking being disposed adjacent to the stop bar in the plane of pivotal movement of the support arm.

9. Apparatus for counting the number of articles traversing a conveyor in a path from upstream on the conveyor to downstream on the conveyor, comprising a stop bar protruding into the path of the articles and extending from the path of the articles in a direction transverse to the direction of said path, a support arm fixed to the stop bar and disposed outside of the path of the articles in spaced relation from said path in a direction transverse to the direction of said path, the support arm extending upstream from the stop bar in a direction substantially parallel to the direction of the path of the articles, a pivot mount journalling the support arm for pivotal movement of the support arm about a pivot axis transverse to the direction of the path of the articles, said pivot axis being spaced from the path of the articles in a direction transverse to the direction of said path and being spaced upstream from the stop bar, first means for urging the support arm about its pivot axis with the stop bar normally disposed in the path of the articles so that the stop bar is moved from said path as an atrticle urged by the conveyor presses against the stop bar and swings the support arm about its pivot axis against the urging of the first means, second means for registering each movement of the stop bar from the path of the articles, third means disposed adjacent to the stop bar in the plane of pivotal movement of the support arm about the pivot axis for supporting the support arm with the stop bar positioned in the path of the articles against the pressure of the articles pressing against the stop bar, and fourth means for removing the third means from supporting position of the support arm to permit an article pressing against the stop bar to swing the support arm about its pivot axis and remove the stop bar from the path of the article under the urging of the conveyor.

References Cited in the file of this patent

UNITED STATES PATENTS

| | | |
|---|---|---|
| 722,937 | Begg | Mar. 17, 1903 |
| 770,260 | Cahill | Sept. 20, 1904 |
| 2,052,840 | Nussbaum | Sept. 1, 1936 |
| 2,338,267 | Stewart | Jan. 4, 1944 |
| 2,493,464 | Nelson | Jan. 3, 1950 |
| 2,730,301 | Beamish | Jan. 10, 1956 |
| 2,736,495 | Calou | Feb. 28, 1956 |
| 2,801,728 | Temple | Aug. 6, 1957 |
| 2,816,647 | Ruth | Dec. 17, 1957 |

UNITED STATES PATENT OFFICE
CERTIFICATE OF CORRECTION

Patent No. 3,045,803                                                 July 24, 1962

John K. Bruce

It is hereby certified that error appears in the above numbered patent requiring correction and that the said Letters Patent should read as corrected below.

Column 4, line 71, for "output" read -- input --.

Signed and sealed this 20th day of November 1962.

(SEAL)
Attest:

ERNEST W. SWIDER                                      DAVID L. LADD
Attesting Officer                                         Commissioner of Patents